(12) United States Patent
Vanderpool (10) Patent No.: US 6,702,645 B2
(45) Date of Patent: Mar. 9, 2004

(54) SEPARATING PARASITES FROM BEES

(76) Inventor: Harry E. Vanderpool, 7128 Skyline Rd. S., Salem, OR (US) 97306

( * ) Notice: Subject to any disclaimer, the term of this patent is extended or adjusted under 35 U.S.C. 154(b) by 0 days.

(21) Appl. No.: 10/408,007

(22) Filed: Apr. 4, 2003

(65) Prior Publication Data

US 2003/0190860 A1 Oct. 9, 2003

Related U.S. Application Data

(60) Provisional application No. 60/370,545, filed on Apr. 4, 2002.

(51) Int. Cl.[7] .............................................. A01K 51/00
(52) U.S. Cl. ............................................ 449/2; 449/50
(58) Field of Search ........................... 449/1, 2, 20, 50, 449/61

(56) References Cited

U.S. PATENT DOCUMENTS

| 4,867,731 | A |   | 9/1989  | Willard et al. ............... 449/2  |
| 5,069,651 | A |   | 12/1991 | Arndt ........................... 449/2  |
| 5,139,462 | A |   | 8/1992  | Gabe ........................... 472/119 |
| 5,162,014 | A | * | 11/1992 | Moore et al. .................. 449/2  |
| 5,348,511 | A | * | 9/1994  | Gross et al. ................... 449/2  |
| 5,683,580 | A |   | 11/1997 | Young ........................ 210/385  |
| 6,468,129 | B1|   | 10/2002 | Griffith ........................ 449/3  |
| 6,475,061 | B1| * | 11/2002 | Huang ........................ 449/12  |

* cited by examiner

Primary Examiner—Robert P. Swiatek
(74) Attorney, Agent, or Firm—Kolisch Hartwell, P.C.

(57) ABSTRACT

A separator for facilitating removal of parasites from bees. The separator includes a bee filtration screen configured to receive bees, to allow passage of parasites therethrough, and to restrict passage of bees therethrough. An agitator is provided to agitate the bee filtration screen so as to dislodge parasites from bees received by the bee filtration screen.

26 Claims, 7 Drawing Sheets

SEPARATING PARASITES FROM BEES

CROSS-REFERENCE TO RELATED APPLICATION

This application claims the benefits of provisional patent application, the content of which is incorporated by reference: MECHANICAL SEPARATOR FOR HONEYBEES AND VARROA MITES, Ser. No. 60/370,545, filed Apr. 4, 2002.

TECHNICAL FIELD

The invention relates generally to parasite control in bee hives, and more specifically, to a mechanical separator for the physical removal of parasites from bees.

BACKGROUND

Bees, like most living organisms, are susceptible to a variety of parasites that may have harmful effects on colony development and productivity. These parasites may have a particularly detrimental impact for professional beekeepers, who depend on the production of honey from bees for their livelihood, and also for scientists, hobbyists, and others who study bee colonies. Known bee parasites include tracheal mites (*acarapis woodi internus*), tropilaelaps (*tropilaelaps clareae*), bee lice (*braula coeca*) and varroa mites (*varroa jacpbsoni*).

One significant event affecting twentieth century beekeeping has been the spread of the parasitic varroa bee mite *varroa jacobsoni*, also known as varroa destructor. Varroa is thought to have originated in East Asia, but is now known to exist on all continents except Australia. Varroa was first detected in North America in 1987 and has spread to all regions of the continent except perhaps to the most isolated areas. The parasitic varroa mites spend their entire life cycle in a bee colony, and typically a varroa-infested colony will die within a few years of infestation, unless a beekeeper intervenes with an effective mite control method.

Current varroa mite control strategies typically include the use of chemical acaricides. Such introduction of chemical pesticides into the hives will be understood to be a primary line of defense to varroa mites. It will be appreciated, however, that the use of chemical pesticides in hives can create numerous undesirable effects. For example, chemical varroa mite controls may inadvertently cause selection for resistance to the treatments due to slight gene variations in the mites. This resistance may render the treatment ineffective due to the brief morphology of varroa mites, and may result in future generations of chemical-resistant mites. Furthermore, some chemical treatments may leave measurable traces of the chemical behind in the wax, possibly detracting from the wholesome image of honey and other products of the hive. Chemical treatments may also inadvertently cause selection of undesirable traits in bees, including increased susceptibility to future parasitization. Chemical mite controls may also place a significant financial drain on beekeepers.

Attempts at more organic varroa mite controls have typically involved labor-intensive procedures. For example, drone brood foundation placed in the hive for the purpose of trapping varroa mites may involve the beekeeper in multiple added visits to each hive. Other hive manipulations include the use of drone combs as varroa traps, and heat treatment of infested combs.

Total eradication of varroa has thus far not been practical. Despite use of the aforementioned varroa mite control strategies, bee colony losses in many areas have ranged from 30% to 100% in recent years. This has delivered a crushing blow to beekeepers and their operations. A need therefore exists for an improved method of removing parasites, particularly varroa mites, from bees and from bee colonies.

SUMMARY

A separator for facilitating removal of parasites from bees is provided. The separator includes a bee filtration screen configured to receive bees, to allow passage of parasites therethrough, and to restrict passage of bees therethrough. An agitator is provided to agitate the bee filtration screen so as to dislodge parasites from bees received by the bee filtration screen.

DETAILED DESCRIPTION

Figure 1:
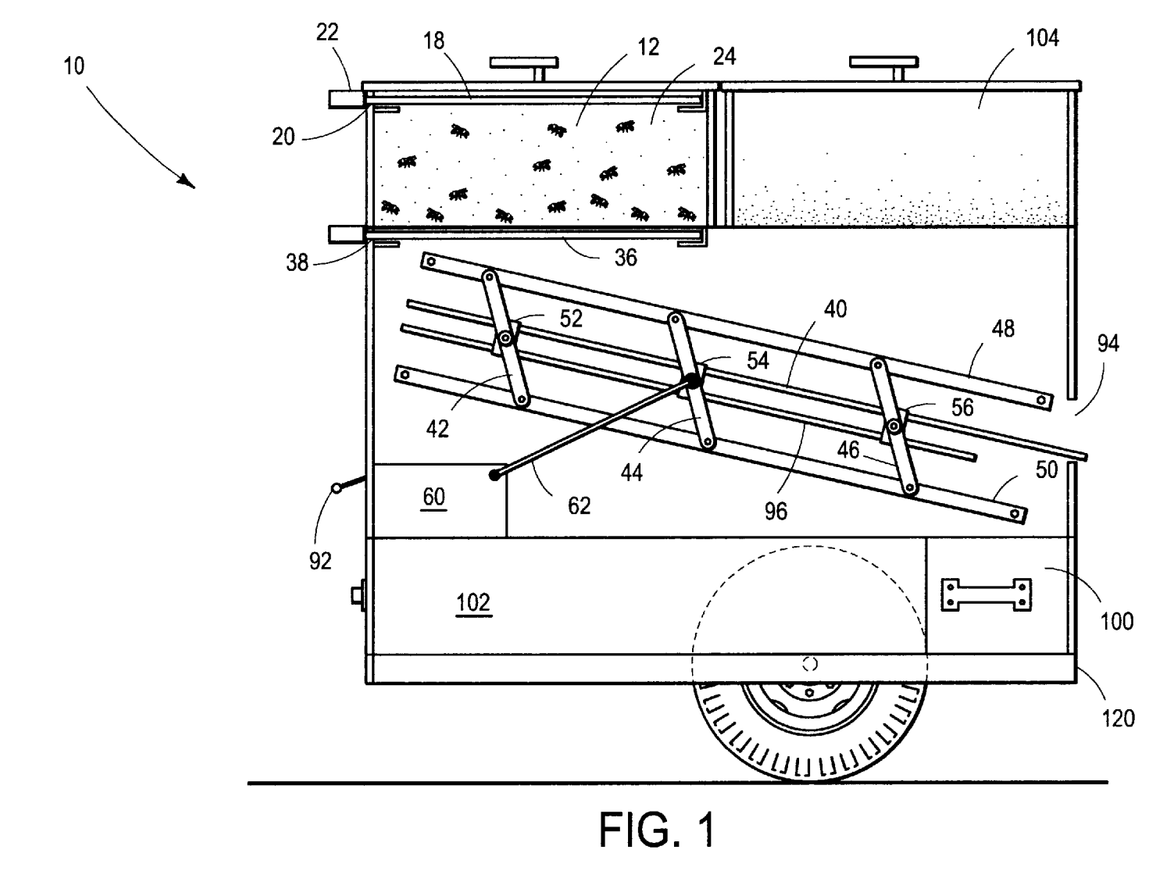
FIG. 1 is a schematic side elevational view of a separator constructed according to an embodiment of the invention.

FIG. 1 is a schematic side elevational view of a separator 10, which is configured to separate parasites from bees according to an embodiment of the present invention. In particular, the depicted separator is useful in removing varroa mites from honeybees and honeybee hives. In FIG. 1, a side panel of separator 10 is removed, allowing inner portions of the separator to be seen. Such inner portions may include, for example, a bee containment chamber 12, one or more filtration screens 40, 96, an agitator 60, and a parasite containment chamber 100. Other components also may be employed, including mechanism useful in applying a release medium to the bees and collecting such release medium upon removing parasites from the bees.

Figure 2:
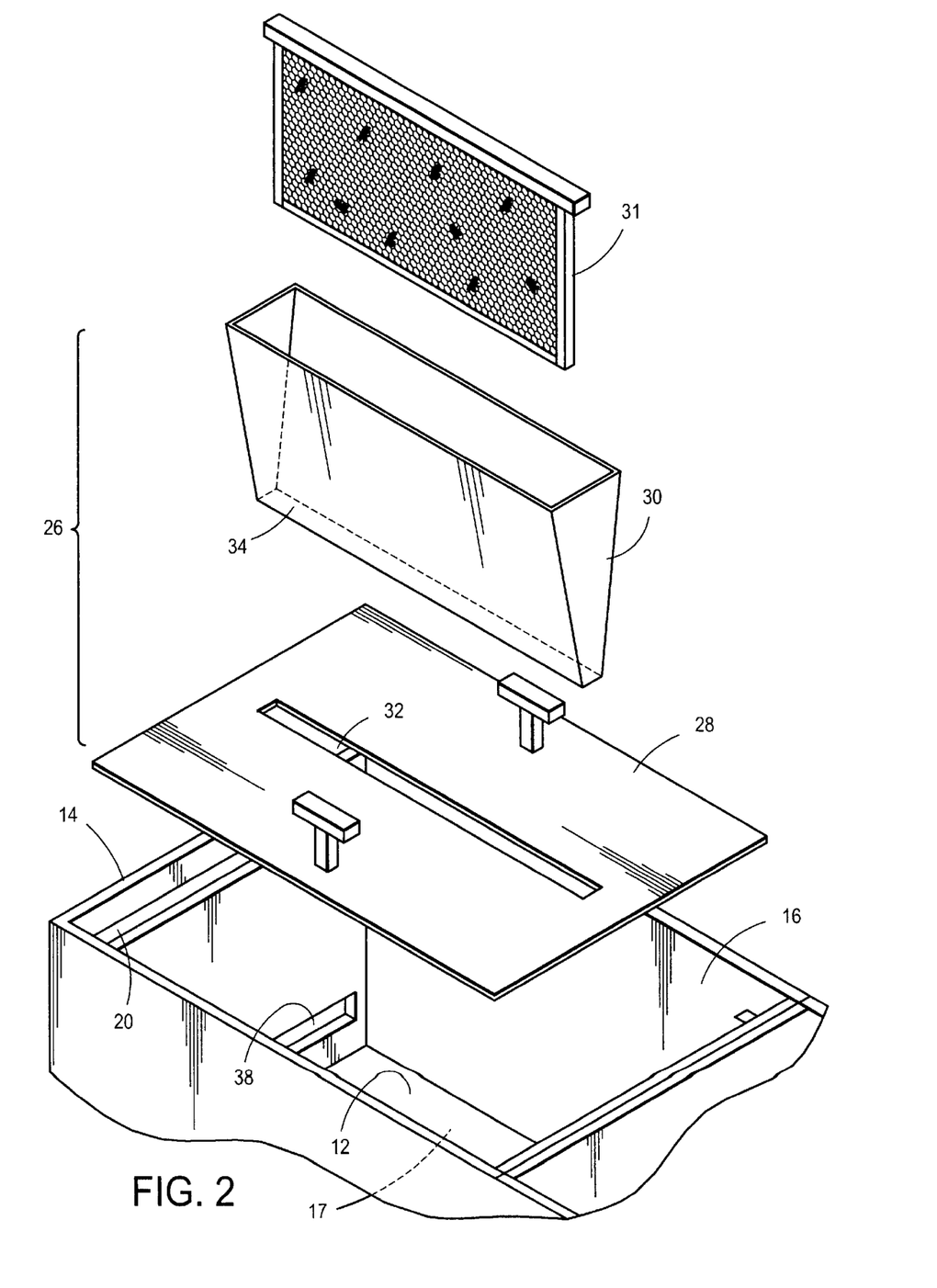
FIG. 2 is an exploded view of a loading apparatus which forms a part of a separator similar to the separator of FIG. 1.

Focusing initially on bee containment chamber 12, and referring for this purpose to FIGS. 1 and 2, it will be noted that containment chamber 12 may be an enclosure of sufficient capacity to contain an entire colony of bees, or any appropriate subset thereof. As shown, containment chamber 12 may include a plurality of walls 14, which define an upper opening 16 and a lower opening 17. A removable upper slide gate 18 may be configured to slide in and out of an upper slot 20 to selectively restrict upper opening 16. A similar removable lower slide gate 36 may be configured to slide in and out of a lower slot 38 to selectively restrict lower opening 17. Collectively, the walls and slide gates may be configured to define a closed body capable of containing bees which are to be treated. The slide gates may be manipulated to control downstream flow of the bees. Each slide gate thus may be equipped with one or more handles 22 whereby the slide gates may be readily retracted and deployed.

Referring particularly to FIG. 2, it will be noted that upper opening 16 may be configured to receive an attachment that facilitates passage of bees through opening 16 and into bee containment chamber 12. One possible attachment is a funnel attachment 26. Funnel attachment 26 includes a substantially flat panel 28, and a rectangular funnel 30 that may be installed in an aperture 32 of flat panel 28. Aperture 32 may be sized to securely receive funnel 30, and panel 28 may be sized to fit securely within opening 16 so as to effectively close access to the bee containment chamber except through funnel 30.

Funnel 30 may be characterized by angles and dimensions suitable for accepting standard beehive frames, so as to direct bees therefrom into bee containment chamber 12. In particular, funnel 30 may be configured to substantially vertically receive a beehive frame, generally indicated at 31, and to allow the frame to be shaken horizontally and/or vertically to dislodge bees from the frame. Dislodged bees may then slide down angled walls of the funnel, and pass through a gap 34 at the bottom of the funnel into bee containment chamber 12. As described below, bees falling through the bee containment chamber 12 may be coated with a release medium, possibly facilitating separation of parasites downstream.

Aside from funnel attachment 26, a number of alternate mechanisms for transferring bees into the containment member are possible. For example, opening 16 may be sized to receive a standard hive super (not shown), so that the hive super (or swarm box) fits securely in upper. opening 16. A standard fume board, treated with a repelling agent such as benzaldehyde or butyric acid, may be installed on top of the hive super for the purpose of guiding bees into bee containment chamber 12. Another method may employ a bee vacuum to vacuum bees into a hive super, and/or to vacuum or blow the bees into the bee containment chamber.

In operation, upper slide gate 18 is retracted while bees are transferred into the containment chamber. Lower slide gate 38 typically is deployed during transfer of bees into the bee containment chamber, thereby restricting immediate passage of the bees downstream. Once the bees are in the bee containment chamber, the upper slide gate may also be deployed so as to prevent egress of the bees through upper opening 16. When desired, lower slide gate 38 may be retracted (FIG. 3), and the bees evacuated through lower opening 17.

Prior to the bees passing out of the containment chamber, a release medium may be applied to the bees to facilitate downstream release of parasites from the bees. Such release medium may be placed in the bee containment chamber prior to entry of the bees, or may be placed in the bee containment chamber (or applied to the bees) after entry of the bees. The release medium may serve to loosen the hold of the parasites on the bees, for example, by coating them with a relatively low-friction substance. Suitable release mediums may include powders and/or mists suitable for ready application to the bees. The release medium also typically should be non-harmful to the bees. One particularly well-suited release medium is powdered sugar, a fine, inert powder which tends to promote decoupling of parasites from bees without harming the bees.

The release medium may be placed into bee containment chamber 12 using any of a number of suitable application mechanisms. One such application mechanism includes a container whereby a quantity of the release medium is poured by hand through opening 16, and into bee containment chamber 12. Another application mechanism, shown schematically in FIG. 8, employs compressed air to transfer the release medium into bee containment chamber 12. In either event, the release medium is placed into bee containment chamber 12 so as to form a mist or cloud 24. Bees placed into the bee containment chamber may fall through cloud 24 so as to coat the bees with the release medium.

Figure 8:
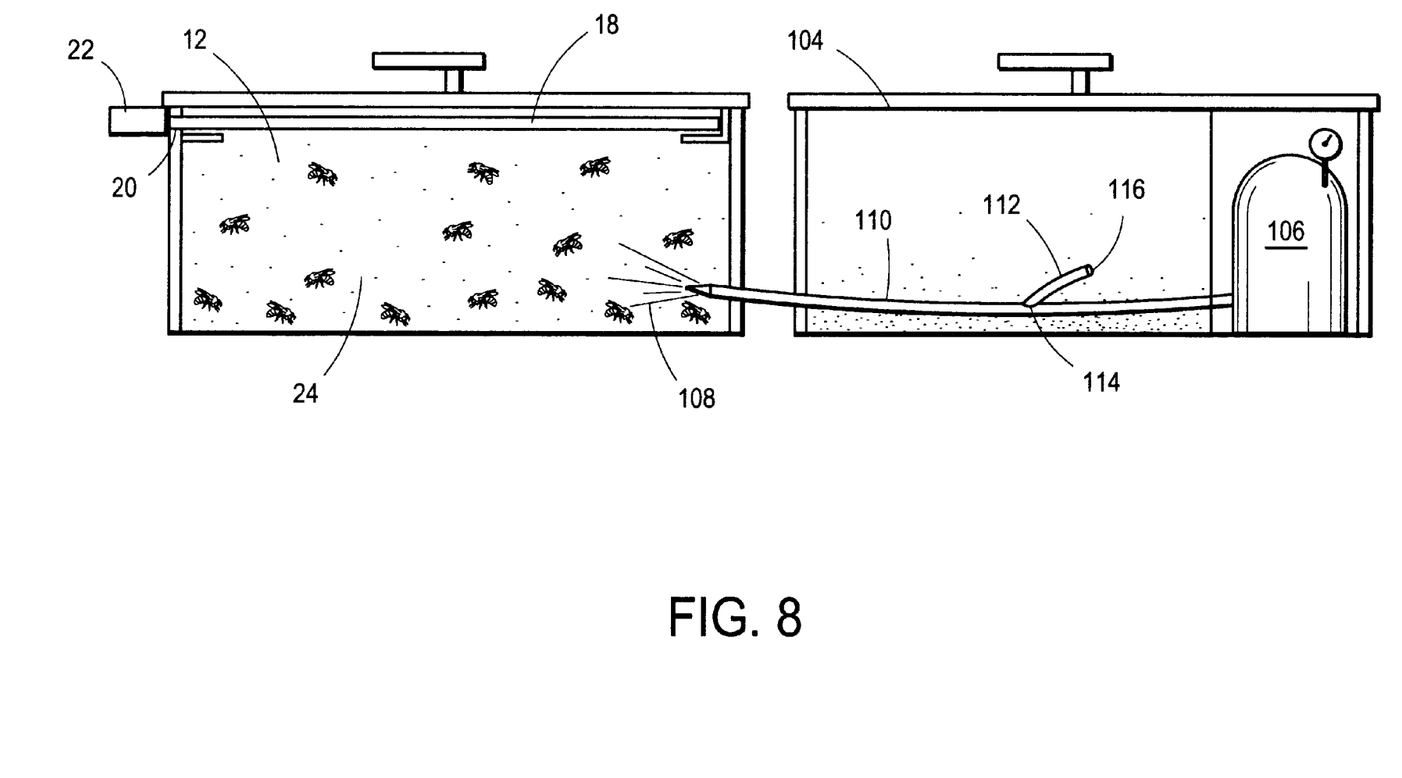
FIG. 8 is a schematic side view of a bee containment chamber and a release medium storage area, showing transfer of release medium to the containment chamber using pressurized gas.

As indicated, FIG. 8 schematically depicts an exemplary release medium application mechanism which employs pressurized gas, such as compressed air, to transport release medium from hopper 104 (and/or collection chamber 102) to bee containment chamber 12. The compressed air may be stored in a tank 106, which may be disposed within hopper 104, or in any other suitable location in or near separator 10. Tank 106 may be configured to direct a stream of compressed air 108 into bee containment chamber 12, possibly through a tubular enclosure, such as hose 110. A communicating channel such as a siphon hose 112 may be disposed with a first end 114 adjacent to the compressed air stream, and a second end 116 adjacent to a quantity of the release medium. It will be appreciated that the compressed air stream may create a partial vacuum in the siphon tubes, causing release medium to be drawn into the siphon tube and thus into the compressed air stream. The release medium may then be sprayed into the bee containment chamber by the compressed air stream, producing the release medium mist or cloud 24.

Figure 3:
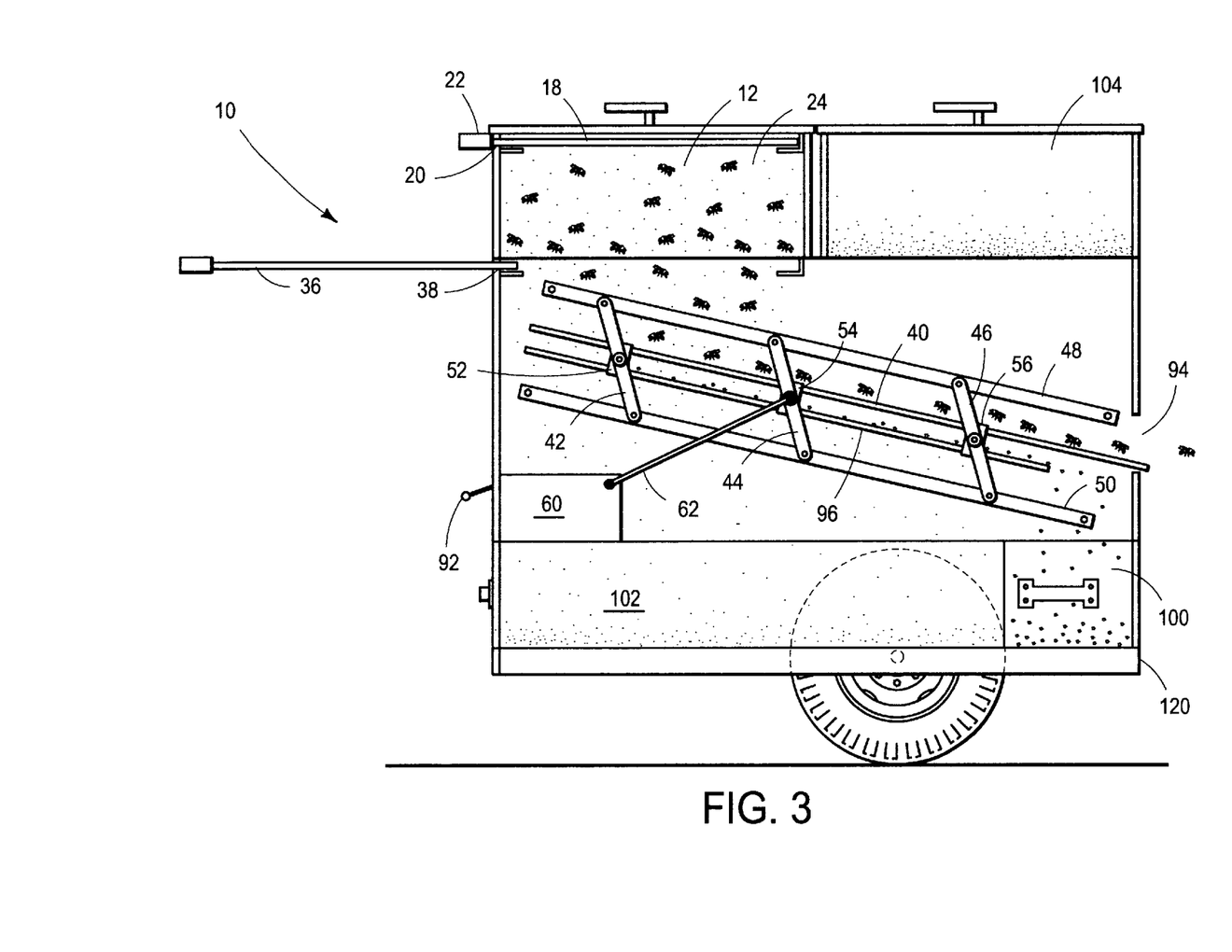
FIG. 3 is another schematic side elevational view of the separator of FIG. 1, depicting separation of parasites from bees.

Referring now particularly to FIG. 3, it will be recalled that once bees have been transferred into bee containment chamber 12, upper slide gate 18 may be deployed in order to restrict egress of the bees through opening 16. Alternatively, or in addition, funnel apparatus 26 (FIG. 2) may be left in place, restricting egress of the bees from bee containment chamber 12. Lower slide gate 36 may be retracted to evacuate the bees downstream from bee containment chamber 12. As indicated above, lower slide gate 36 may be configured to slide in and out of lower slot 38, and may be similar in construction to upper slide gate 18. Alternatively, lower slide gate 36 may include one or more doors, hinged from the bottom edges and manually, pneumatically, and/or electro-mechanically moved.

The bottom of bee containment chamber 12 thus may define a passage for delivery of bees onto bee filtration screen 40. Accordingly, upon retracting or opening of lower slide gate 36, bees in bee containment chamber 12 fall or otherwise pass downstream onto the bee filtration screen as shown in FIG. 3.

In accordance with one aspect of the invention, bee filtration screen 40 typically includes a plurality of apertures sized to allow passage of parasites and release medium therethrough, but to prevent passage of bees. For example, the apertures in the bee filtration screen may be oblong, with a width between approximately 0.05 inches and approximately 0.20 inches, and a length of approximately 0.125 inches. It will be appreciated, however, that apertures of different size and/or shape may be used depending on the size and/or shape of the bees, and the nature of the parasite to be removed.

It will be appreciated that agitation of bee filtration screen 40 may serve to dislodge parasites from the bees, and may serve to convey the bees towards an exit of the separator, shown generally at 94. The parasites and the release medium, which are small enough to pass through bee filtration screen 40, may remain in the separator for collection and/or further separation. In particular, a parasite filtration screen 96, may be employed to separate parasites from the release medium. Such parasite filtration screen may be disposed below bee filtration screen 40 so as to capture parasites and release medium which passes through the bee filtration screen. Parasite filtration screen 96 may include a plurality of apertures sized to allow passage of the release medium but to restrict passage of parasites therethrough. For example, the apertures may be square, and may be between approximately 0.005 inches and approximately 0.05 inches across. The actual size and shape of the apertures in the parasite filtration screen may be chosen based on the nature of parasites to be filtered, and the particular release medium used.

A parasite containment chamber 100 may be provided for collection and containment of decoupled parasites. As depicted in FIG. 3, the parasite containment chamber may be disposed at or near a terminal end 98 of parasite filtration screen 96. This may facilitate collection of parasites conveyed to end 98 by agitation of the parasite filtration screen and/or under the influence of gravity. Parasite containment chamber 100 may take the form of a drawer (or portion of a drawer) or similar container, which may be slidably or otherwise removable from the separator. Where the parasite containment area is disposed adjacent to bee filtration screen 40, as shown, access to the parasite collection area by bees may be restricted by bee filtration screen 40, thus limiting occurrences of treated bees being accidentally reinfested with parasites after separation.

As depicted in FIGS. 1 and 3, bee filtration screen 40 may be supported by one or more pivotal and/or flexible hangars 42, 44, and 46. These hangars, in turn, may be supported by support members 48 and 50, which may be bolted or otherwise secured to one or more fixed surfaces in separator 10. The hangars may be attached to bee filtration screen 40 through one or more connecting members 52, 54, and 56, which may also serve to link the bee filtration screen with parasite filtration screen 96, as described further below. The hangars typically maintain a desired alignment of the filtration screens, while allowing the screens to be agitated. This may be possible, in part, because the hangars are flexible, and/or are pivotally attached to the support members and/or the connecting members.

Bee filtration screen 40 may be operatively connected to an agitator 60, so that the bee filtration screen may be agitated to dislodge parasites (such as varroa mites) from bees on the bee filtration screen. Agitator 60 may take the form of a vibratory motor configured to provide vibration, such as eccentric vibration, to bee filtration screen 40 (and thus to parasite filtration screen 96). Such vibratory motor may be controlled using a power switch 92 associated with separator 10. Vibration thus may be selectively transferred to the bee filtration screen through one or more connecting rods 62, further details of which are provided in connection with FIGS. 4 and 5.

Figure 4:
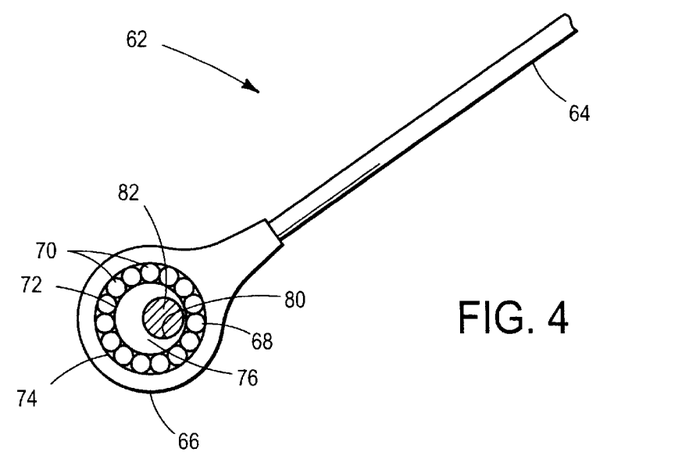
FIG. 4 is a side elevational view of a connecting rod for agitating one or more filtration screens of a separator such as that shown in FIGS. 1 and 3.

As indicated in FIG. 4, connecting rod 62 may include a shaft portion 64 and a cam portion 66. Cam portion 66 may include a bearing race 68 having a plurality of bearings 70 configured to articulate with inner race surface 72 and/or outer race surface 74. Bearings 70 may be, for example, cylindrical or spherical, and may be lubricated to reduce friction. Cam portion 66 of connecting rod 62 may also include an insert 76 that may be inserted within inner race surface 72. Insert 76 may define a hole 80 disposed asymmetrically within the insert to fixedly capture a drive rod 82. For example, hole 80 may be centered approximately 3/16-inch from the center of insert.

Figure 5:
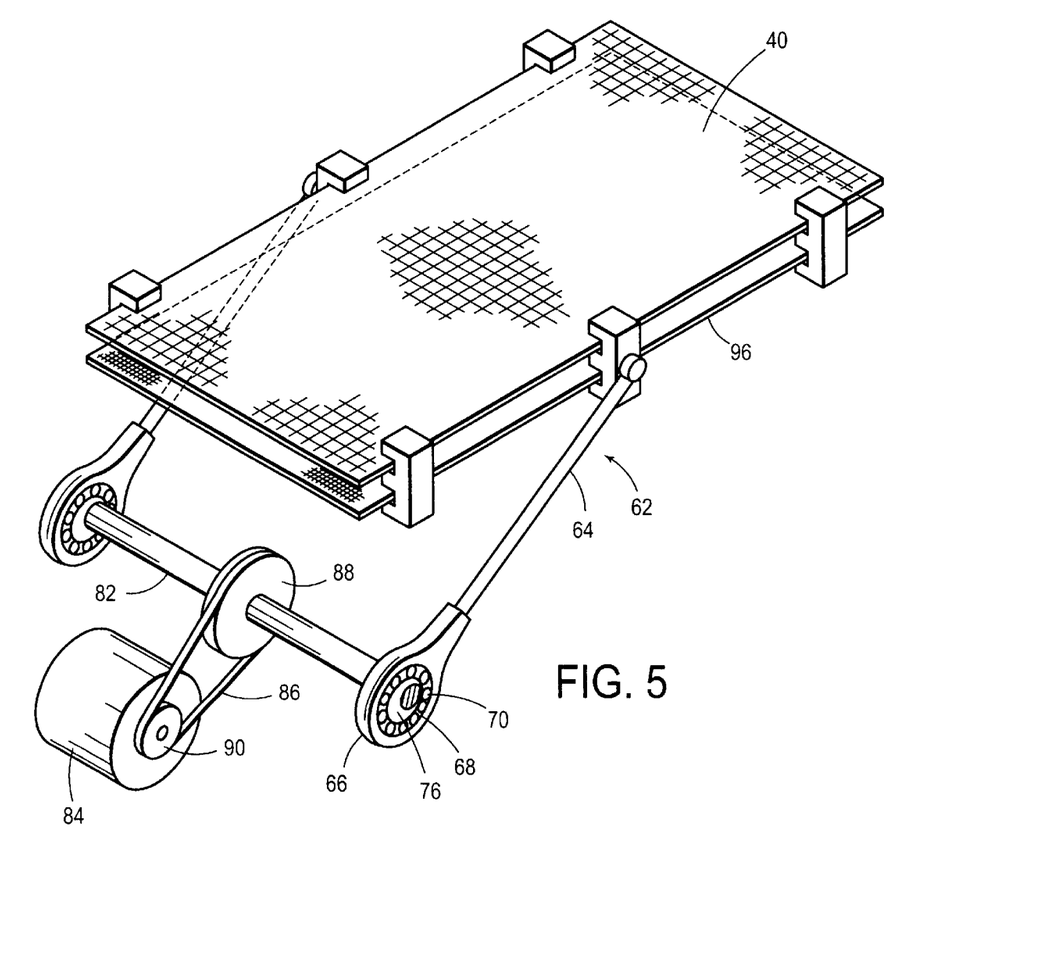
FIG. 5 is a perspective view of portions of a vibratory motor apparatus connected to filtration screens via connecting rods such as that shown in FIG. 4.

FIG. 5 illustrates use of two connecting rods 62, which may be configured to mount securely on rotatable axle or shaft 82. Shaft 82, in turn, may be rotated by a motor, shown generally at 84. Motor 84 may be an electric motor, which may be connected to shaft 82 by an arrangement of belts 86 and/or pulleys 88, 90, represented schematically in FIG. 5. It should be appreciated, however, that any arrangement resulting in rotation of shaft 82 and/or suitable agitation of filtration screens 40 and 96 would suffice. In operation, rotation of shaft 82 may cause insert 76 to rotate, in which case the asymmetric disposition of shaft 82 within the insert may cause eccentric and/or elliptical motion of the associated connecting rods 62. The connecting rod motion may then be transferred to bee filtration screen 40 and parasite filtration screen 96.

In one embodiment, the vibratory frequency range of the agitator may be between 375 and 550 cycles per minute, and the angle between the vertical axis and hangers 42, 44, and 46 may be between approximately 30 degrees and approximately 35 degrees. It should be noted, however, that numerous other combinations of vibratory frequency and hangar angle may be provided to effect the intended purposes of dislodging parasites and conveying bees downstream out of the separator.

Figure 6:
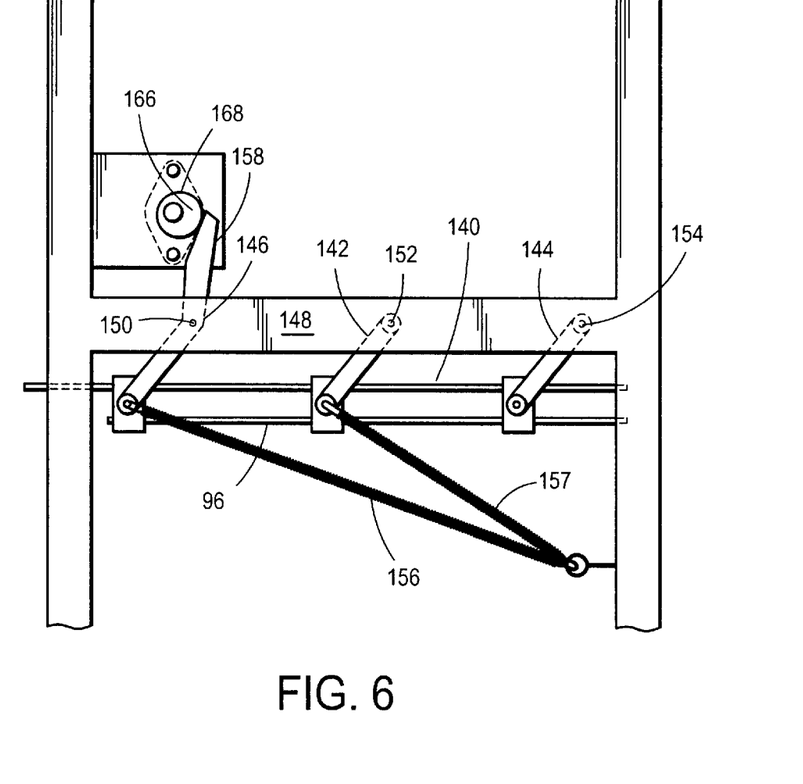
FIG. 6 is a schematic side elevational view of portions of a separator, showing alternative mechanism for agitating filtrations screens according to aspects of the present invention.

FIG. 6 depicts an alternative arrangement for agitating filtration screens. As indicated, a bee filtration screen 140 may be attached to hangars 142, 144, and to a lift member 146. The hangars and the lift member may be pivotally attached to a rigid frame 148 of the separator at attachment points 150, 152, 154 as indicated, and may be free to pivot about such attachment points. A spring 156 may be provided to pivotally bias lift member 146 about attachment point 150 so that an upper lift member portion 158 stays in contact with an outer surface 168 of eccentric cam 166. A second spring 157 similarly may bias hanger 142 relative to attachment point 152 to enhance the indicated effect.

Figure 7:
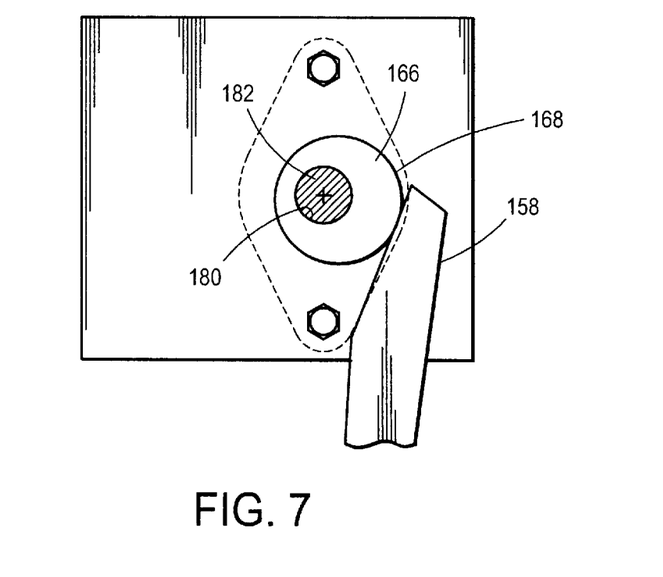
FIG. 7 is an enlarged side view, showing details of an eccentric cam and lift member shown generally in FIG. 6.

As is best seen in FIG. 7, cam 166 may be similar in construction to insert 76 of the cam portion shown in FIGS. 4 and 5, defining a hole 180 centered asymmetrically relative to the center of cam 166. Cam 166 thus is configured to mount on a rotatable shaft 182. Rotation of shaft 182 will be understood to cause asymmetrical rotation of cam 166, causing upper portion 158 of lift member 146 (which engages outer surface 168 of cam 166) to pivot back and forth. Motion of lift member 146 may then be transferred to the filtration screen as already described. Cam 166 and upper portion 158 may be lubricated to decrease friction between them.

In FIG. 3, parasite filtration screen 96 is shown rigidly connected to bee filtration screen 40, and is shown connected to support hangars 42, 44, and 46, to facilitate separation of release medium from parasites by agitating parasite filtration screen 96 along with bee filtration screen 40. In some embodiments, however, it may be desirable to provide a separate parasite filtration screen that is not attached to the bee filtration screen, and that is not caused to vibrate by the agitator. In this case, the parasite filtration screen may itself perform the function of a parasite containment chamber or collection area. For example, the parasite filtration screen may take the form of a removable shallow tray, still including apertures as described previously, and disposed generally below bee filtration screen 40. In such embodiments, parasites passing through bee filtration screen 40 may remain on the parasite filtration screen, which may be configured to be easily removable in order to dispose of parasites trapped thereon.

A release medium collection chamber 102 also may be employed. Release medium collection chamber 102 may be disposed below filtration screens 40 and 96, so that release medium that passes through filtration screens 40 and 96 may collect there. Release medium collection chamber 102 may be a slidably removable drawer, allowing collected release medium to be easily accessed for disposal and/or reuse.

A loader or hopper 104 may also be used to store quantities of the release medium in a convenient location relative to the containment chamber where the release medium is applied to the bees. Storage of a large amount of release medium in hopper 104 may be particularly convenient for treating a number of hives or for multiple hive treatments, without the need for returning to a remote release medium storage area.

The components described so far may be mounted on a portable supporting frame 120. The frame may take the form of a rollable or otherwise movable cart, trailer, and/or truck to facilitate movement of separator 10 between hives. The overall apparatus may be sized in various dimensions depending on the number and/or frequency of hives to be serviced.

Figure 9:
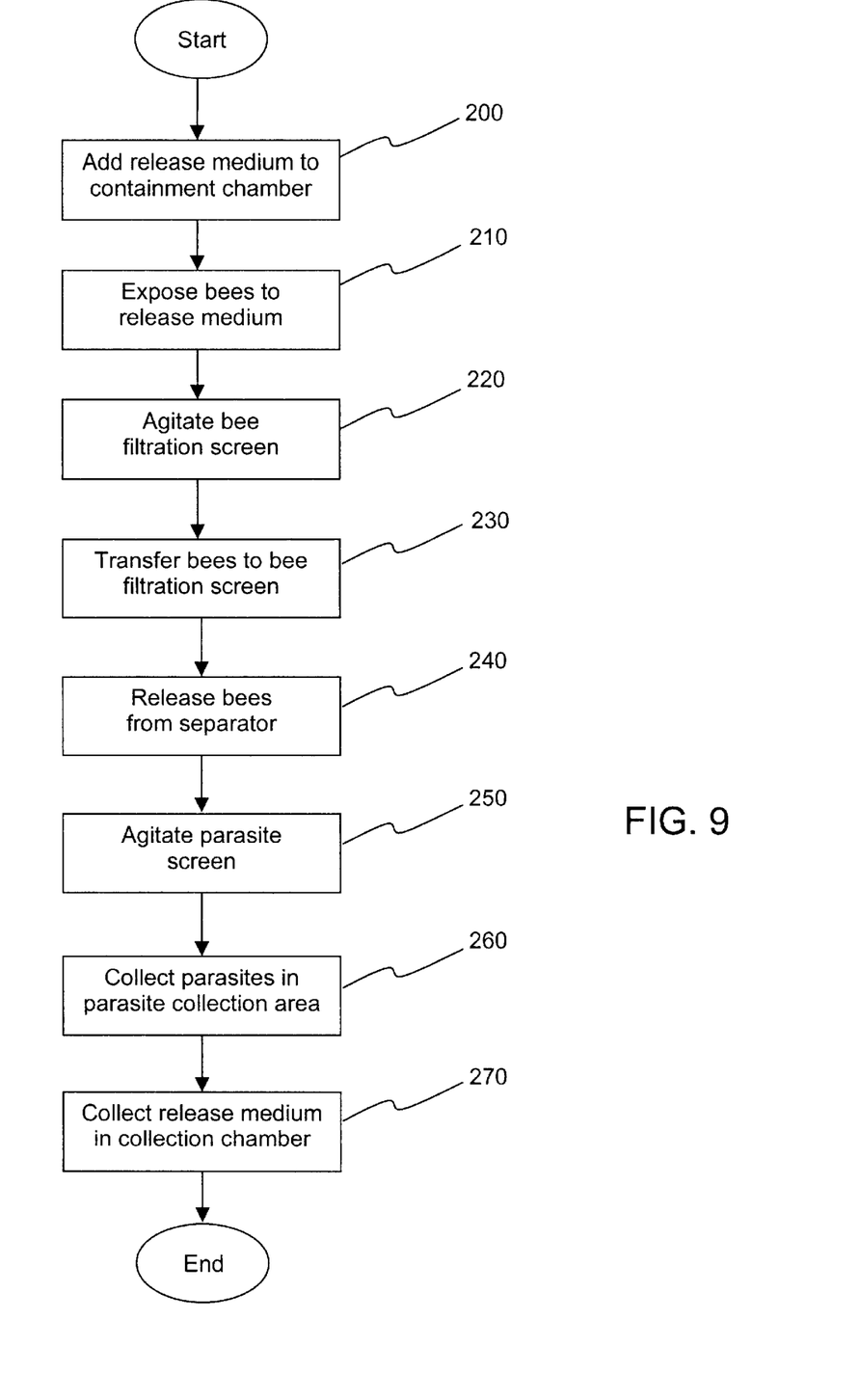
FIG. 9 is a flowchart showing a method of separating parasites from bees, according to an embodiment of the invention.

An example of a method of parasite separation is now presented and outlined in FIG. 9. While this example is presented in reference to the particular features of the embodiments already depicted, it should be appreciated that the methods disclosed are more broadly applicable.

In preparation for a separation process, it may be desirable to force the infested bee colonies broodless (i.e., without larval offspring present in the hive) by caging the queen bee for twenty-four days prior to the separation of parasites. This may increase the number of parasites attached to bees, rather than to larvae, so that more parasites may be vulnerable for separation. The separator may then be moved into close proximity of a hive, and the hive may be smoked in a manner familiar to those skilled in the art of beekeeping.

Referring to FIG. 9, a quantity of release medium, for example, one to two cups of powdered sugar, may be added to a bee containment chamber of the separator, as indicated at 200. Alternatively, the release medium may be applied using a compressed air mechanism, as described previously. Other methods of delivering release medium to the containment chamber also are possible.

An attachment such as funnel attachment 26 (FIG. 2) may be placed into an opening of the upper chamber. The top super, or hive body, may be removed from the hive and placed next to the separator. A first frame of bees may be removed from the top super, and lowered partially into a rectangular funnel, such as funnel 30. The frame of bees may be shaken to dislodge bees from the frame into the funnel. The dislodged bees may slide down the angled sides of the funnel, through gap 34 at the bottom of the funnel, and into the containment chamber, thereby exposing the bees to the release medium, as indicated at 210. The remainder of frames of bees may be shaken into the funnel in a similar manner, and the frames may be placed back in the super.

Note that various other methods of delivering bees into the separator and exposing them to the release medium are possible. As described previously, these include placing a hive super directly on the separator and using a fume board to direct bees into the containment chamber, vacuuming bees from a hive and delivering them into the containment chamber with a vacuum pump, and using a swarm box to transport a colony of bees from a hive to the containment chamber, among others. After the top super has been emptied of bees, the bees from subsequent supers may be delivered into the containment chamber and exposed to the release medium in a similar manner. The supers may then be returned to the hive.

Pressing a start button or switch on the separator may cause agitation of a bee filtration screen within the separator, as indicated at 220. The bees in the bee containment chamber may be transferred to the bee filtration screen, as indicated at 230. This may be accomplished, for example, by opening a gate such as lower slide gate 36 in FIGS. 1 and 3. The bees thus may fall onto the vibrating bee filtration screen. The bees may be agitated on the bee filtration screen, causing separation of parasites from the bees based on size. Due to the agitation of the bee filtration screen and/or under the influence of gravity, the agitated bees may be delivered to an exit of the separator and released onto the ground and/or into the air, as indicated at 240. After release, the bees may naturally return to their hive.

Separated parasites may fall through apertures in the bee filtration screen and onto a parasite filtration screen. As indicated at 250, in some embodiments, the parasite filtration screen may be agitated. The parasites may be vibrationally and/or gravitationally conveyed towards a separate parasite containment chamber (or collection area), as indicated at 260. The release medium may drop through the bee filtration screen and the parasite filtration screen and be collected in a release medium collection chamber, as indicated at 270. The parasites and release medium thus also are separated based on size.

While the present description has been provided with reference to the foregoing embodiments, those skilled in the art will understand that many variations may be made therein without departing from the spirit and scope defined in the following claims. The description should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element or the equivalent thereof, such claims should be understood to include incorporation of one or more such elements, neither requiring, nor excluding, two or more such elements.

What is claimed is:

1. A separator for facilitating removal of parasites from bees, the separator comprising:

a bee filtration screen positioned to receive bees, and configured to allow passage of parasites therethrough, but to restrict passage of bees therethrough; and an agitator configured to agitate the bee filtration screen to dislodge parasites from bees received by the bee filtration screen.

2. The separator of claim 1, further comprising a release medium application mechanism configured to apply a release medium to the bees, the release medium being selected to accommodate dislodging of parasites from the bees.

3. The separator of claim 2, where the release medium includes an inert powder.

4. The separator of claim 3, where the inert powder is powdered sugar.

5. The separator of claim 1, further comprising:
- a bee containment chamber defining a passage for delivery of bees onto the bee filtration screen; and
- a release medium application mechanism configured to dispense a release medium into the containment chamber for application to bees contained therein, the release medium being selected to accommodate dislodging of parasites from the bees.

6. The separator of claim 5, wherein the release medium application mechanism includes an opening in the containment chamber, and wherein the opening is configured to allow the release medium to be dispensed therethrough.

7. The separator of claim 6, wherein the release medium application mechanism includes a stream of pressurized fluid configured to transport the release medium through the opening in the bee containment chamber.

8. The separator of claim 7, wherein the pressurized fluid is compressed air.

9. The separator of claim 1, further comprising a parasite containment chamber disposed to collect parasites which pass through the bee filtration screen.

10. The separator of claim 9, wherein the parasite collection area includes a removable tray.

11. The separator of claim 1, further comprising a parasite filtration screen positioned to receive parasites from the bee filtration screen, the parasite filtration screen being configured to allow passage of a release medium but to restrict passage of parasites.

12. The separator of claim 11, wherein the agitator is further configured to agitate the parasite filtration screen to facilitate separation of the parasites from the release medium.

13. The separator of claim 12, which further comprises a parasite containment chamber disposed adjacent a terminal end of the parasite filtration screen, agitation of the parasite filtration screen being effective to transfer parasites to the terminal end of the parasite filtration screen and into the parasite containment chamber.

14. The separator of claim 11, further comprising a release medium collection chamber disposed to collect release medium which passes through the parasite filtration screen.

15. The separator of claim 1, wherein the agitator and bee filtration screen are further configured to transfer bees downstream to an exit.

16. A method of removing parasites from bees, comprising:
- agitating bees to induce release of parasites from the bees; and
- separating the bees from the parasites by filtering the bees and parasites based on size.

17. The method of claim 16, further comprising exposing the bees to a release medium to facilitate dislodging of the parasites from the bees.

18. The method of claim 17, further comprising collecting the separated parasites in a parasite containment chamber.

19. The method of claim 17, further comprising directing the bees from a hive into a bee containment chamber configured to receive the release medium for application to the bees.

20. The method of claim 19, wherein exposing the bees to a release medium includes providing a suspension of release medium within the containment chamber.

21. The method of claim 20, wherein exposing the bees to a release medium further includes transporting the release medium to the containment chamber within a stream of compressed air.

22. The method of claim 17, further comprising filtering the parasites from the release medium based on size.

23. The method of claim 22, further comprising agitating the parasites separated from the bees to facilitate separation of the release medium from the parasites.

24. The method of claim 22, further comprising collecting the separated release medium in a release medium collection chamber.

25. The method of claim 17, wherein the release medium includes an inert powder.

26. The method of claim 25, wherein the inert powder is powdered sugar.

* * * * *